US011079487B2

(12) United States Patent
Reed et al.

(10) Patent No.: US 11,079,487 B2
(45) Date of Patent: Aug. 3, 2021

(54) COMMUNICATION OF INFRASTRUCTURE INFORMATION TO A VEHICLE VIA GROUND PENETRATING RADAR

(71) Applicant: Ford Global Technologies, LLC, Dearborn, MI (US)

(72) Inventors: Eric L. Reed, Livonia, MI (US); Jonathan Diedrich, Carleton, MI (US); Adil Nizam Siddiqui, Farmington Hills, MI (US); Thomas Michael McQuade, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 416 days.

(21) Appl. No.: 15/683,357

(22) Filed: Aug. 22, 2017

(65) Prior Publication Data
US 2019/0064345 A1    Feb. 28, 2019

(51) Int. Cl.
*G01S 13/931* (2020.01)
*G08G 1/0967* (2006.01)
(Continued)

(52) U.S. Cl.
CPC ............ *G01S 13/931* (2013.01); *G01S 13/75* (2013.01); *G01S 13/885* (2013.01);
(Continued)

(58) Field of Classification Search
CPC ...... G01S 13/931; G01S 13/75; G01S 13/885; G01S 2013/932; G08G 1/0967;
(Continued)

(56) References Cited

U.S. PATENT DOCUMENTS 8,306,747 B1 *  11/2012  Gagarin .................. G01C 7/04
                                                          701/408
8,949,024 B2 *   2/2015  Stanley ................ G05D 1/0257
                                                          340/988
(Continued)

FOREIGN PATENT DOCUMENTS

| CN | 104597442 A | 5/2015 |
| DE | 102014216276 A1 | 2/1916 |
| DE | 102007043460 A1 | 3/2009 |

OTHER PUBLICATIONS

Matthew Cornick et al., Localizing Ground Penetrating RADAR: A Step Toward Robust Autonomous Ground Vehicle Localization, May 2014, (21 Pages) Lexington, Massachusetts.

*Primary Examiner* — Bo Fan
(74) *Attorney, Agent, or Firm* — Frank Lollo; Eversheds Sutherland (US) LLP

(57) ABSTRACT

Method and apparatus are disclosed for communication of infrastructure information to a vehicle via ground penetrating radar. A vehicle comprising an antenna positioned to broadcast radio waves below the vehicle, a ground penetrating radar system, and an active safety module. The ground penetrating radar system determines types of reflectors and a spatial relationship between the reflectors based on radar cross-sections detected by the antenna, and generates a signature based on the shapes and the spatial relationship. The active safety module determines environmental data based on the signature, and autonomously control the vehicle based on the environmental data.

7 Claims, 5 Drawing Sheets

(51) Int. Cl.
    *G01S 13/75*      (2006.01)
    *G05D 1/02*       (2020.01)
    *G01S 13/88*      (2006.01)
    *G05D 1/00*       (2006.01)
(52) U.S. Cl.
    CPC ......... *G05D 1/0257* (2013.01); *G05D 1/0261* (2013.01); *G08G 1/0967* (2013.01); *G08G 1/096783* (2013.01); *G01S 2013/932* (2020.01); *G05D 1/0088* (2013.01); *G05D 2201/0213* (2013.01)
(58) Field of Classification Search
    CPC ........... G08G 1/096783; G05D 1/0261; G05D 1/0257; G05D 2201/0213; G05D 1/0088; B60W 30/09; B60W 2420/52; B60W 2555/20
    USPC .......................................................... 342/22
    See application file for complete search history.

(56) References Cited

U.S. PATENT DOCUMENTS

| | | | |
|---|---|---|---|
| 2004/0030499 A1* | 2/2004 | Knoop | B60K 31/0008 701/301 |
| 2010/0052971 A1* | 3/2010 | Amarillas | G01S 13/862 342/22 |
| 2017/0139042 A1* | 5/2017 | Alenljung | G01S 7/2921 |

* cited by examiner

COMMUNICATION OF INFRASTRUCTURE INFORMATION TO A VEHICLE VIA GROUND PENETRATING RADAR

TECHNICAL FIELD

The present disclosure generally relates to autonomous vehicles and, more specifically, communication of infrastructure information to a vehicle via ground penetrating radar.

BACKGROUND

Autonomous vehicle and semi-autonomous vehicles handle motive functions of the vehicle without direct driver input. Autonomous vehicles control substantially all of the motive functions, while semi-autonomous vehicles handle some motive functions (sometime referred to as "driver assist") (e.g., lane keeping assist, autopilot, remote parking assist, etc.). Traditionally, these vehicles includes sensors (e.g., standard RADAR, LiDAR, cameras, ultrasonic sensors, etc.), communications modules (e.g., cellular modems, vehicle-to-vehicle modules, etc.), and position data (e.g., via a global positioning system (GPS) receiver, etc.) to provide information regarding the environment in which the vehicle is driving. Cameras, for example, have limitations that can affect lane tracking due to low light conditions, deteriorating road markings, and environmental conditions (e.g., snow, etc.) that can obscure road markings. As another example, in urban canyons, GPS signals can be unreliable to provide an exact enough position of the vehicle to determine which lane the vehicle is in on a multi-lane road.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for communication of infrastructure information to a vehicle via ground penetrating radar. A vehicle comprising an antenna positioned to broadcast radio waves below the vehicle, a ground penetrating radar system, and an active safety module. The ground penetrating radar system determines types of reflectors and a spatial relationship between the reflectors based on radar cross-sections detected by the antenna, and generates a signature based on the shapes and the spatial relationship. The active safety module determines environmental data based on the signature, and autonomously control the vehicle based on the environmental data.

An example method includes broadcasting, with a ground penetrating radar antenna affixed to a vehicle, radio waves below the vehicle. The method also includes determining types of reflectors and a spatial relationship between the reflectors based on radar cross-sections detected by the antenna. Additionally, the method includes generating a signature based on the shapes and the spatial relationship and determining environmental data based on the signature. The method also includes autonomously controlling the vehicle based on the environmental data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
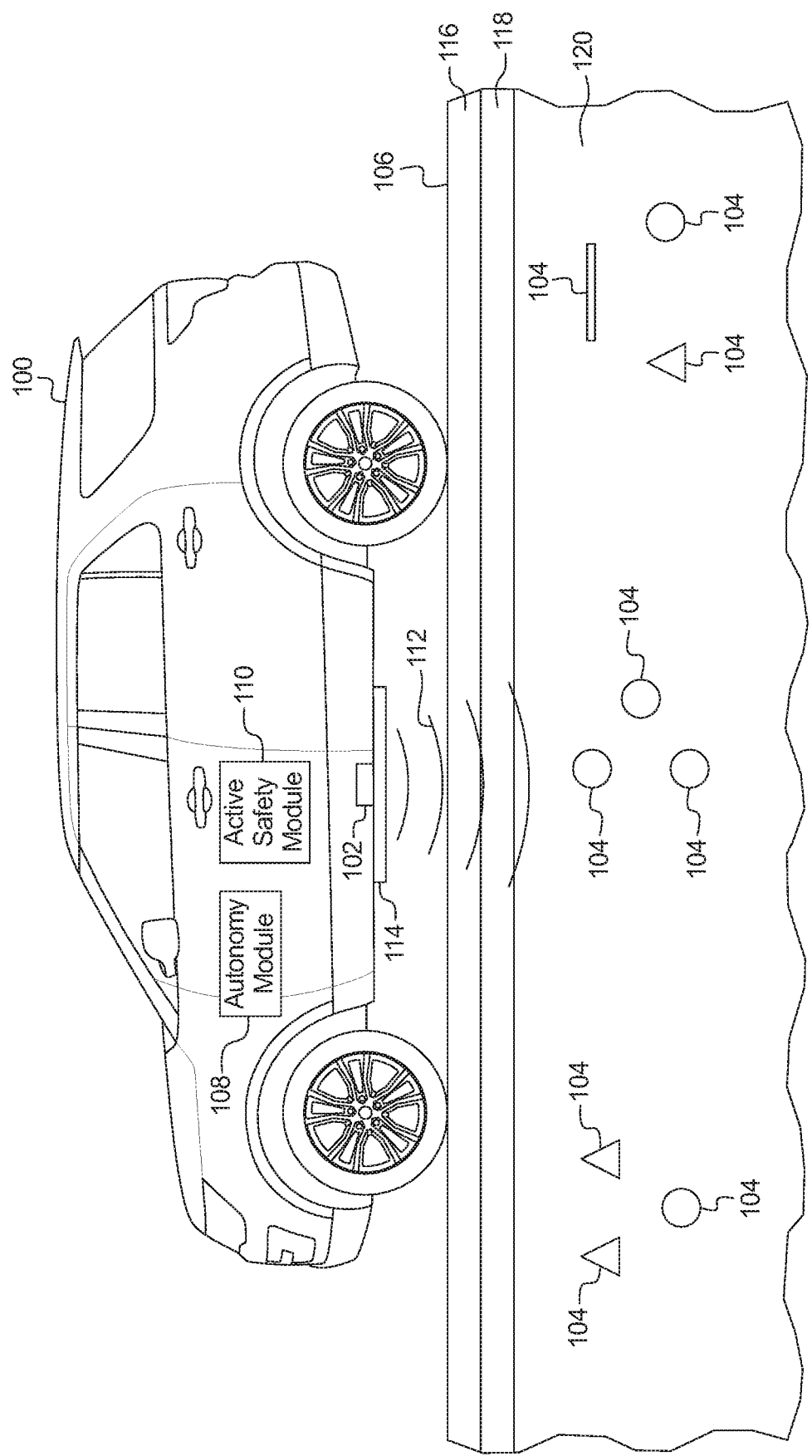
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Autonomous and semi-autonomous vehicles use information regarding the environment to autonomously navigate roads in that environment. This information includes locations and directions of lanes, speed limits, cautions (e.g., school zones, midblock crosswalks, hospitals, sharp curves, steep gradients, etc.), and/or traffic control (e.g., traffic signals, stop signs, yield signs, etc.). Often, vision-based system or perception-based system (e.g., cameras, LiDAR, forward RADAR, etc.) have trouble distinguishing environmental features, especially when road conditions (e.g., lane markers, crosswalks, stop lines, etc.) and/or informational signs (e.g., traffic signals, stop signs, yield signs, etc.) are obscured (e.g., by weather, by wear, etc.). Additionally, GPS signals on the commercial band not provide enough accuracy to determine which lane on a multi-lane road the vehicle is traveling in.

Increasingly, vehicles are manufactured to include automotive radar systems that include radar transceivers that typically operates at a frequency of 77 gigaHertz (GHz) because of the radio frequency propagation characteristics and resolution. These radar transceivers are embedded in the front and rear bumpers and/or the sides of the vehicle. As described below, the vehicle additionally or alternatively includes one or more ground penetrating radar (GPR) antennas positioned on the bottom of the vehicle so that the signals generated by the GPR antennas propagate through the road surface below the vehicle. The GPR antennas operate at a relatively low frequency (e.g., 10 megaHertz (MHz) to 2.6 GHz) to facilitate ground penetration. In some examples, when the operating frequency of the GPR antennas is very low (e.g., 10 MHz to 100 MHz, etc.) a post-processing technique (e.g., via Laplacian filtering, unsharp masking, bilateral filtering, etc.) is applied to sharpen the resolution of the response. The GPR antennas emit radio frequency energy and then reads reflections from reflectors to determines the characteristics of the three dimensional space below the vehicle.

As discussed below, the reflectors are embedded in the subsurface of the road. Using the GPR antenna, the vehicle determines the characteristics of the reflectors embedded in the subsurface of the road below the vehicle. The reflectors have different geometries that produce different radar cross-sections when the radio waves reflect off the reflectors. Additionally, two or more reflectors are positioned in the subsurface in a predefined three dimensional pattern. The reflectors have specific reflection cross-sections (sometime referred to as "patterns" or "signatures") that are robust to deviations in incidence angle. In such a manner, variations due to installation and movement over time do not substantially alter the three dimensional relationships of the reflectors. An active safety module of the vehicle detects the different depths and different radar cross-sections that form the predefined three dimensional pattern. The detected pattern is compared to a list of known patterns to determine the information to be communicated by the pattern embedded in the subsurface of the road. The communicatable information includes a direction of travel identifier (e.g., north bound, south bound, etc.), a lane identifier (e.g., a right lane, a left lane, a center lane, a turn-only lane, on-ramp, off-ramp, etc.), road information (e.g., road curvature, road gradient, etc.), speed limit information, traffic control information (e.g., stops signs, traffic signals, yield signs, stop lines, midblock crosswalks, etc.), and/or caution information (e.g., school zones, hospital zones, etc.), etc. This information is forwarded to the autonomous functions of the vehicle to supplement information from other sources (e.g., the automotive radar, the LiDAR, the ultrasonic sensors, the GPS receiver, etc.).

FIG. 1 illustrates a vehicle 100 operating in accordance with the teachings of this disclosure. The vehicle 100 of the illustrated example uses a ground penetrating radar (GPR) system 102 to detect patterns of reflectors 104 to determine environmental data regarding a road 106 on which the vehicle 100 is traveling. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, electric motor, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). In the illustrated example the vehicle 100 includes an autonomy unit 108, the GPR system 102, and an active safety module 110.

The autonomy unit 108 is in communication with the electronic control units (ECUs) that control the motive functions (e.g., steering, brake, and throttle, etc.) of the vehicle 100. The autonomy unit 108 includes hardware and firmware to facilitate navigating the vehicle 100 in various traffic scenarios autonomously without driver intervention using camera(s), range detection systems (e.g., automotive radar, LiDAR, ultrasonic sensors, etc.) and/or navigational data/vehicle position data (e.g., coordinates from global positioning system (GPS) receivers, horizon data, vehicle status data from an inertial measurement unit (IMU), etc.). Additionally, in the illustrated example, the autonomy unit uses the environmental data (e.g., a direction of travel identifier, a lane identifier, road information, speed limit information, traffic control information, and/or caution information, etc.) from the active safety module 110.

The GPR system 102 is positioned on the bottom of the vehicle 100 to direct radio frequency (RF) waves 112 towards the road 106 below the vehicle 100. In the illustrated example, the vehicle 100 includes on radar antenna or radar antenna array 114. Alternatively, in some examples, the GPR system 102 includes multiple radar antennas or radar antenna arrays 114 located on the bottom of the vehicle 100. The operating frequency of the GPR system 102 is a low frequency (e.g., between 10 MHz to 2.6 GHz) to facilitate ground penetration. The GPR system 102 detects characteristics of the road 106 below the vehicle 100.

Figure 2:
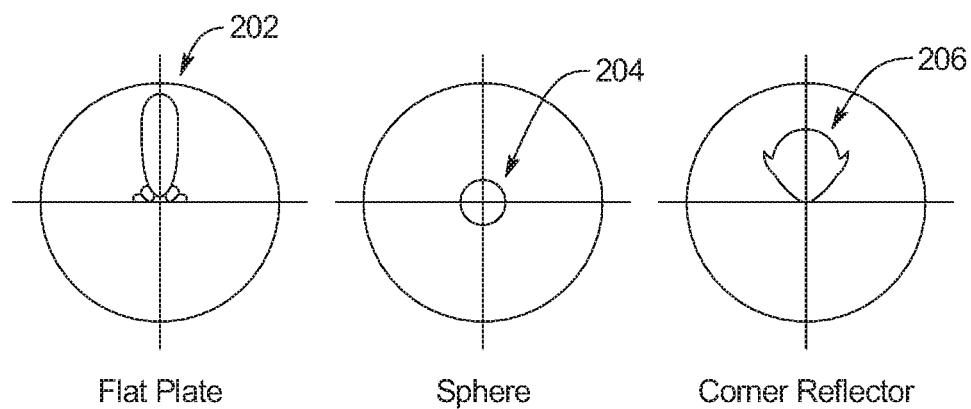
FIG. 2 illustrates example radar cross-sections of different shapes of reflectors embedded in a subsurface of a road.

In the illustrated example, below the road 106 includes a surface layer 116 (e.g., made of asphalt, concrete, etc.), a base layer 118 (e.g., made of crushed stone, slag, concrete, or slate, etc.), and a subsurface layer 120 (e.g., composed of dirt, etc.). The reflectors 104 are embedded in the subsurface layer 120. In some examples, the reflectors have a spatial relationship that is at least partially defined by some of the reflectors in a groups of reflectors being embedded in the subsurface layer at different depths. The reflectors 104 have different possible geometries (e.g., a flat plate, a sphere, a tetrahedron, an angle bracket, etc.) that, when detected by the GPR system 102, have different radar cross-sections. FIG. 2 illustrates different radar cross-sections 202, 204, and 206. For example, one radar examples of cross-section 202 is of a reflector 104 shaped like a flat plate. Another radar cross-section 204 is of a reflector 104 that is a sphere. Another radar cross-section 206 is of a reflector 104 that is a tetrahedral. Returning to FIG. 1, the reflectors 104 are positioned within the subsurface layer 120 in a predefined three-dimensional pattern. In some examples, the three-dimensional patterns include reflectors 104 that have different shapes that produce different radar cross-sections (e.g., the radar cross-sections 202, 204, and 206 of FIG. 2).

Figure 3:
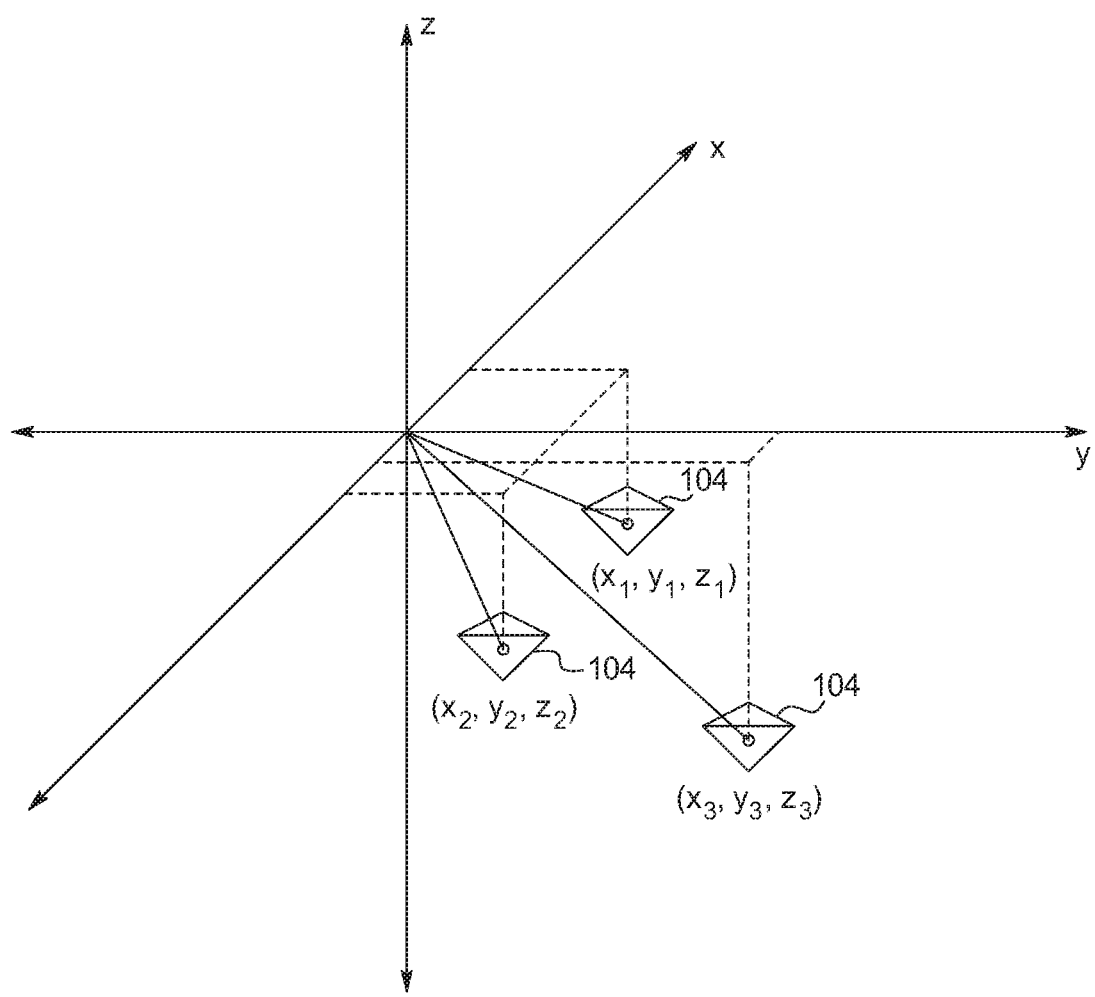
FIG. 3 illustrates three-dimensional placement of the reflectors embedded in the subsurface of the road.

FIG. 3 illustrates multiple reflectors 104 that have a predefined spatial relationship. The spatial relationship may have components on the x-axis, the y-axis, and/or the z-axis. For example, some patterns may include a spatial relationship on only the x-axis, the y-axis, or the z-axis, or the spatial relationship may have components on any of the three axes. The cross-sections of the reflectors 104 and the predefined spatial relationship are uniquely identified by the GPR system 102. The GPR system 102 generates a signature based on the cross-sections of the reflectors 104 and the predefined spatial relationship. As the vehicle 100 traverses a road the GPR system 102 detects the patterns of the reflectors 104, the GPR system 102 generates a series of signatures.

The active safety module 110 controls functions of the vehicle 100 that assist the vehicle 100 and/or driver safely traverse the road 106. There functions include an anti-lock brake system, electronic stability control, traction control, brake assist, adaptive cruise control, and/or collision avoidance, etc. In some examples, in autonomous vehicles, the active safety module 110 may be combined with the autonomy unit 108. Additionally, in some examples, semi-autonomous vehicles may only the active safety module 110. The active safety module 110 receives the signatures from the GPR system 102 and determines the environmental data corresponding to the signatures and forwards the environmental data to the autonomy unit 108. The active safety module 110 includes a database and/or a lookup table that associates the signatures to the environmental data. For example, a particular signature may correspond to a speed limit of 25 miles per hour (mph). In some examples, the active safety module 110 communicatively couples to an external network (e.g., via a cellular modem, etc.) to connect to a server that (a) stores the database and/or the lookup table and/or (b) provides the associations for the database and/or the lookup table for the geographic region the vehicle 100 is in.

Figure 4:
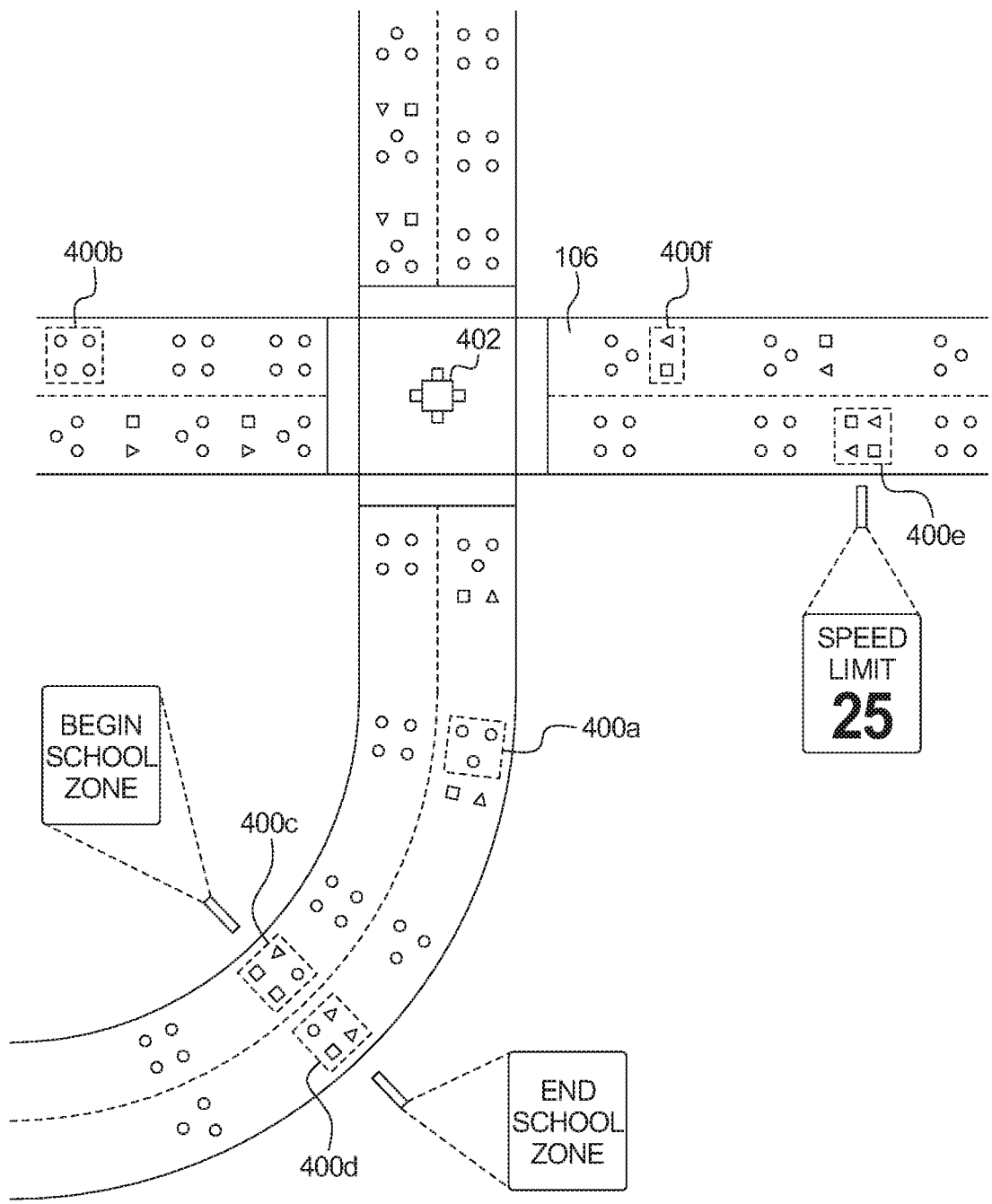
FIG. 4 illustrates an example road with the reflectors embedded in the subsurface of the road.

FIG. 4 illustrates an example road with the reflectors 104 embedded in the subsurface layer 120 of the road 106. In the illustrated example, the reflectors 104 are embedded in patterns 400*a*-400*f*. The patterns 400*a*-400*f* may include reflectors 104 that have a predefine three-dimensional spatial relationship. In the illustrated example, the patterns 400*a*-400*f* are embedded in the road and are aligned with the corresponding lanes. In some examples, the vehicle 100 may determine its alignment with the lanes based on detecting the patterns 400*a*-400*f*. Different signatures generated from the different patterns 400*a*-400*f* are associated with different environmental data in the database and/or lookup table accessible by the active safety module 110. For example one pattern 400*a* may be associated with a left lane identifier and another pattern 400*b* may be associated with a right lane identifier. As another example, one pattern 400*c* may be associated with the beginning of a school zone and another pattern 400*d* may be associated with the end of a school zone. As another example, one pattern 400*e* may be associated with a speed limit. As another example, a pattern 400*f* may be associated with traffic signal 402. The patterns 400*a*-400*f* are locate in the vicinity relevant to the information they are representing.

Figure 5:
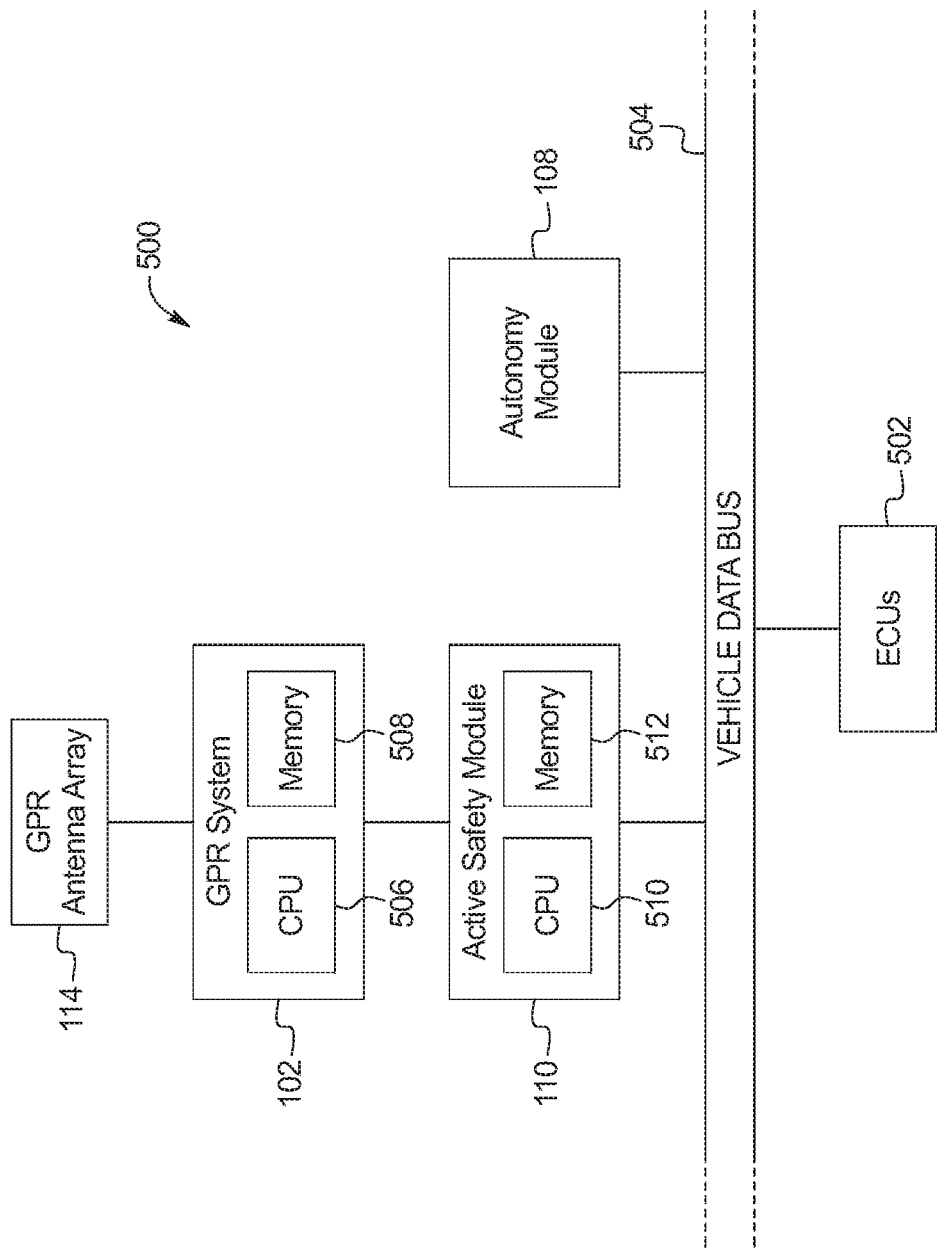
FIG. 5 is a block diagram of electronic components of the vehicle of FIG. 1.

FIG. 5 is a block diagram of electronic components 500 of the vehicle 100 of FIG. 1. In the illustrated example, the electronic components 500 include the GPR system 102, the autonomy unit 108, the active safety module 110, electronic control units (ECUs) 502, and a vehicle data bus 504.

The example GPR system 102 includes a processor or controller 506 and memory 508. The processor or controller 506 may be any suitable processing device or set of processing devices such as, but not limited to: a microprocessor, a microcontroller-based platform, a suitable integrated circuit, a digital signal processor (DSP), a graphics processor, one or more field programmable gate arrays (FPGAs), and/or one or more application-specific integrated circuits (ASICs). The memory 508 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 508 includes multiple kinds of memory, particularly volatile memory and non-volatile memory.

The memory 508 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 508, the computer readable medium, and/or within the processor 506 during execution of the instructions.

The example active safety module 110 includes a processor or controller 510 and memory 512. The processor or controller 510 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 512 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 512 includes multiple kinds of memory, particularly volatile memory and non-volatile memory. In some examples, the database and/or lookup table for the radar cross-section pattern signatures is stored in the memory 512.

The memory 512 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 512, the computer readable medium, and/or within the processor 510 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The ECUs 502 monitor and control the subsystems of the vehicle 100. The ECUs 502 communicate and exchange information via a vehicle data bus (e.g., the vehicle data bus 504). Additionally, the ECUs 502 may communicate properties (such as, status of the ECU 502, sensor readings, control state, error and diagnostic codes, etc.) to and/or receive requests from other ECUs 502. Some vehicles 100 may have seventy or more ECUs 502 located in various locations around the vehicle 100 communicatively coupled by the vehicle data bus 504. The ECUs 502 are discrete sets of electronics that include their own circuit(s) (such as integrated circuits, microprocessors, memory, storage, etc.) and firmware, sensors, actuators, and/or mounting hardware. The ECUs 502 may include a power train control unit, a body control unit, a steering wheel control unit, and/or a telematics unit, etc.

The vehicle data bus 504 communicatively couples the autonomy unit 108, the active safety module 110, and the ECUs 502. In some examples, the vehicle data bus 504 includes one or more data buses. The vehicle data bus 504 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
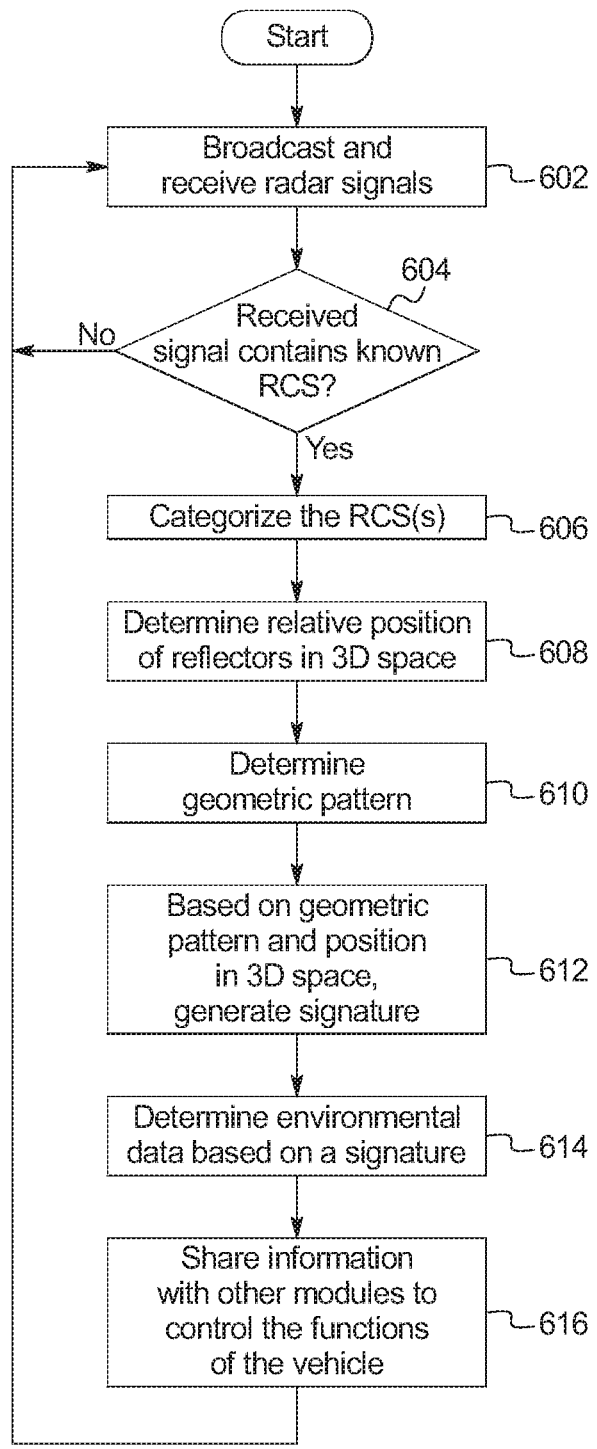
FIG. 6 is a flowchart of a method to communicate infrastructure information to the vehicle of FIG. 1, which may be implemented by the electronic components of FIG. 5.

FIG. 6 is a flowchart of a method to communicate infrastructure information to the vehicle 100 of FIG. 1, which may be implemented by the electronic components 500 of FIG. 5. Initially, at block 602, the GPR system 102 broadcasts RF waves 112 and receives reflections of objects (such as the reflectors 104) in the road 106 below the vehicle 100. At block 604, the GPR system 102 determines whether the reflections are indicative of radar cross-sections (RCS) (e.g., the radar cross-sections 202, 204, and 206 of FIG. 2 above) of one or more of the reflectors 104. When the detected RCSs correspond to one or more of the reflectors 104, the method continues at block 606. Otherwise, when the detected RCSs do not correspond to one or more of the reflectors 104, the method returns to block 602.

At block 606, the GPR system 102 categorizes the reflectors 104 into their different shapes (e.g., plate, sphere, tetrahedral, etc.) based on the RCSs detected at block 604. At block 608, the GPR system 102 determines the relative positions of the reflectors 104 in three-dimensional space. At block 610, based on the shapes of the reflectors 104 and the relative positions of the reflectors 104 in three-dimensional space, the GPR system 102 generates a signature for the pattern. At block 612, the active safety module 110 determines the environmental data associated with the signature generated at block 610. At block 614, the active safety module 110 shares the environmental data with other modules (e.g., the autonomy unit 108, the ECUs 502, etc.) to control the functions of the vehicle 100.

The flowchart of FIG. 6 is representative of machine readable instructions stored in memory (such as the memory 508 and 512 of FIG. 5) that comprise one or more programs that, when executed by a processor (such as the processor 506 or 510 of FIG. 5), cause the vehicle 100 to implement the example GPR system 102 and/or the example active safety unit 110 of FIGS. 1 and 5. Further, although the example program(s) is/are described with reference to the flowchart illustrated in FIG. 6, many other methods of implementing the example GPR system 102 and/or the example active safety unit 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an antenna positioned to broadcast radio waves below the vehicle;
a ground penetrating radar system to:
determine shapes of reflectors and a spatial relationship between the reflectors based on radar cross-sections detected by the antenna, wherein the reflectors are embedded below a road surface, wherein the reflectors are positioned in a predefined pattern providing a unique spatial relationship indicative of environmental data that is outside of the road surface, wherein each of the reflectors in the unique spatial relationship has one or more components on at least one of an x-axis, a y-axis, and a z-axis; and
generate a signature based on the shapes and the spatial relationship; and
an active safety module to:
determine a match between the signature and the predefined pattern;
determine environmental data based on the match; and
autonomously control the vehicle based on the environmental data.

2. The vehicle of claim 1, wherein the radio waves have a frequency between 10 MHz and 2.4 GHz.

3. The vehicle of claim 1, wherein the radar cross-sections are indicative of at least two types of the reflectors.

4. The vehicle of claim 1, wherein the environmental data includes at least a direction of travel and a lane identifier for a portion of the road on which the vehicle is driving.

5. The vehicle of claim 1, wherein the signature corresponds to the environmental data, the environmental data including one of traffic signal information, speed limit information, or caution information.

6. The vehicle of claim 1, wherein the radar cross-sections are cause by the reflectors that are selected from a group of a flat plate, a sphere, and a tetrahedron.

7. The vehicle of claim 1, wherein the spatial relationship is a three-dimensional spatial relationship indicating that at least two of the reflectors are embedded at different predetermined depths below the road surface.

* * * * *